(12) United States Patent
Petrova et al.

(10) Patent No.: US 7,082,834 B2
(45) Date of Patent: Aug. 1, 2006

(54) FLEXIBLE THIN FILM PRESSURE SENSOR (75) Inventors: Roumiana S. Petrova, New Milford, NJ (US); Hee C. Lim, Edison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 10/869,648

(22) Filed: Jun. 16, 2004

(65) Prior Publication Data
US 2004/0255682 A1 Dec. 23, 2004

Related U.S. Application Data (60) Provisional application No. 60/479,398, filed on Jun. 18, 2003.

(51) Int. Cl.
*G01L 19/04* (2006.01)
(52) U.S. Cl. ..................... 73/708; 361/283.1
(58) Field of Classification Search ............. 73/708, 73/721, 727, 726, 719, 720; 361/283.1
See application file for complete search history.

(56) References Cited

U.S. PATENT DOCUMENTS

| 3,328,653 | A | * | 6/1967 | Wolf, Jr. ............... 361/283.4 |
| 4,345,476 | A | * | 8/1982 | Singh ....................... 73/720 |
| 4,433,580 | A |   | 2/1984 | Tward |
| 4,467,656 | A | * | 8/1984 | Mallon et al. ............. 73/727 |
| 4,685,469 | A | * | 8/1987 | Keller .................... 600/488 |
| 5,020,377 | A | * | 6/1991 | Park ....................... 73/718 |
| 5,432,372 | A | * | 7/1995 | Ohtani .................... 257/419 |
| 5,610,340 | A |   | 3/1997 | Carr et al. |
| 5,637,905 | A |   | 6/1997 | Carr et al. |
| 5,668,320 | A | * | 9/1997 | Cowan ..................... 73/708 |
| 5,681,997 | A | * | 10/1997 | McHale et al. ............ 73/727 |
| 5,867,886 | A | * | 2/1999 | Ratell et al. .............. 29/595 |
| 6,006,607 | A | * | 12/1999 | Bryzek et al. ............. 73/727 |
| 6,131,466 | A | * | 10/2000 | Vigna et al. .............. 73/721 |
| 6,568,276 | B1 | * | 5/2003 | Ciminelli ................. 73/720 |
| 6,700,174 | B1 | * | 3/2004 | Miu et al. ............... 257/419 |

OTHER PUBLICATIONS

Paul Horowitz et al (The art of Electronics II edition 1989 Canbridge University Press p. 421.*

(Continued)

*Primary Examiner*—Edward Lefkowitz
*Assistant Examiner*—Andre Allen
(74) *Attorney, Agent, or Firm*—Gregory C. Ranieri (57) ABSTRACT Low pressure sensing and imperviousness to corrosion and to the effects of harsh environments are achieved in a pressure sensor that employs a flexible membrane supporting piezoresistive elements. A plurality of piezoresistive elements are aligned substantially collinearly across one surface of the flexible membrane. Innermost piezoresistive elements are disposed in such a way that they experience tension in response to an applied pressure, whereas outermost piezoresistive elements are disposed in such a way that they experience compression in response to the same applied pressure. Contact pads for each end of each piezoresistive element allow the elements to be configured in any number of desirable arrangements. In one exemplary embodiment, four piezoresistive elements are disposed along a main central axis of the membrane. The contacts of the elements are connected to form a Wheatstone bridge. Conventional Wheatstone bridge techniques are utilized to convert an applied pressure into an output electrical signal. The membrane includes amorphous or nanocrystalline semiconductor layers grown on a flexible substrate such as Kapton or suitable plastic materials.

9 Claims, 5 Drawing Sheets

OTHER PUBLICATIONS

C. Malhaire, D. Barbier, "Design of a Polysilicon-on-Insulator Pressure Sensor With Original Polysilicon Layout for Harsh Environment", Thin Solid Films 427 (2003) 362-366.

E. Defay et al., "PZT Thin Films Integration for the Realisation of a High Sensitivity Pressure Microsensor Based on a Vibrating Membrane", Sensors and Actuators A 99 (2002) 64-67.

Andreas Kuoni et al., "Polyimide Membrane With ZnO Piezoelectric Thin Film Pressure Transducers as a Differential Pressure Liquid Flow Sensor", Journal of Micromechanics and Microengineering 13 (2003) S103-S107.

R. Timothy Edwards, "Microfabrication Lab Project Report: A Simple CMOS Pressure Sensor", Dec. 1994.

* cited by examiner

FLEXIBLE THIN FILM PRESSURE SENSOR

CROSS-REFERENCE TO RELATED APPLICATIONS

This application claims benefit of U.S. Provisional Patent Application Ser. No. 60/479,398, filed Jun. 18, 2003, which is herein incorporated by reference in its entirety.

BACKGROUND OF THE INVENTION

1. Field of the Invention

This invention relates to the field of pressure sensors and, more particularly, to thin-film pressure sensors adapted for low pressure sensing applications.

2. Description of the Related Art

Pressure sensors have wide applicability today from microphones, household electronics, and simple vacuum sensing applications to biomedical instrumentation, wind tunnel, and automotive performance applications. Many of these devices depend on integrated sensor technology that utilizes the piezoresistive effect. Simply put, the piezoresistive effect is one in which the resistance of an element changes as a result of length changes for that element generally as a result of stress. Resistance changes can behave anisotropically in directions parallel to and perpendicular to the direction of the stress.

It is well known in sensor technology to employ a Wheatstone bridge arrangement of piezoresistors to sense pressure and pressure changes. The arrangement commonly chosen involves four piezoresistors located at four distinct edges of a pressure sensing membrane that is supported on a substrate. Generally, the position chosen for each resistor is one where the stress is greatest when vertical pressure is applied to the membrane at its the center or uniformly across the membrane surface. In these designs, orientation of the piezoresistors is also important. Usually, two piezoresistors are oriented parallel to the direction of stress so that their resistance increases with increasing pressure and the other two piezoresistors are oriented perpendicular to the direction of stress so that their resistance decreases with increasing pressure. See, for example, C. Malhaire et al., "Design of a polysilicon-on-insulator pressure sensor with original polysilicon layout for harsh environment," Thin Solid Films, No. 427, pp. 362–366 (2003) and U.S. Pat. No. 6,700,174 issued to Miu et al. on Mar. 2, 2004.

Most proposed designs known in the art include rigid substrates. This limits the applicability of such pressure sensors to relatively high pressure environments. Many of the rigid substrates commercially known utilize metallic membranes such as stainless steel. These membranes are easily damaged in severe natural or corrosive environments.

SUMMARY OF THE INVENTION

Operation at low pressure and imperviousness to corrosion and to the effects of harsh environments are achieved in a pressure sensor that employs a flexible membrane supporting piezoresistive elements. A plurality of piezoresistive elements are aligned substantially collinearly across one surface of the flexible membrane. Innermost piezoresistive elements are disposed in such a way that they experience tension in response to an applied pressure, whereas outermost piezoresistive elements are disposed in such a way that they experience compression in response to the same applied pressure. Contact pads for each end of each piezoresistive element allow the elements to be configured in any number of desirable arrangements.

In one exemplary embodiment, four piezoresistive elements are disposed along a main central axis such as the diameter of the membrane. The contacts are connected in such a way that a Wheatstone bridge is formed by the elements. Conventional Wheatstone bridge techniques are utilized to convert the applied pressure into an output electrical signal. The membrane includes amorphous semiconductor layers grown on a flexible substrate such as Kapton substance or suitable plastic materials in order to achieve flexibility and the sensitivity to respond to low pressure.

BRIEF DESCRIPTION OF THE DRAWINGS

A more complete understanding of the invention may be obtained by reading the following description of specific illustrative embodiments of the invention in conjunction with the appended drawings in which.

It is to be noted that the appended drawings illustrate only typical embodiments of this invention and are therefore not to be considered limiting of its scope, for the invention may admit to other equally effective embodiments. Where possible, identical reference numerals have been inserted in the figures to denote identical elements.

DETAILED DESCRIPTION

A new flexible, thin-film, low-pressure sensor has been realized using a pressure sensing membrane having n-doped hydrogenated amorphous silicon piezoresistive elements and metal-on-amorphous silicon contacts all formed on a flexible substrate using illustrative materials such as Kapton and plastics. Piezoresistive elements are disposed substantially along a major axis of the membrane so that innermost elements are subjected to tension and outermost elements are subjected to compression when pressure is applied to the membrane. Piezoresistive sensing elements are adapted to be connected together to form any desired circuit arrangement including a Wheatstone bridge. The structure of the membrane and the elements reduces the effect of temperature on sensor accuracy.

From experimental results, it has been observed that a pressure sensor incorporating the flexible membrane described herein is useful for sensing low pressure variations, particularly, variations in the range from 0–2 psi. Due to chemical and mechanical properties of the membrane, the sensor is capable of low pressure sensing in severe natural environments and in the presence of corrosive systems, all without the risk of contamination.

Figure 1:
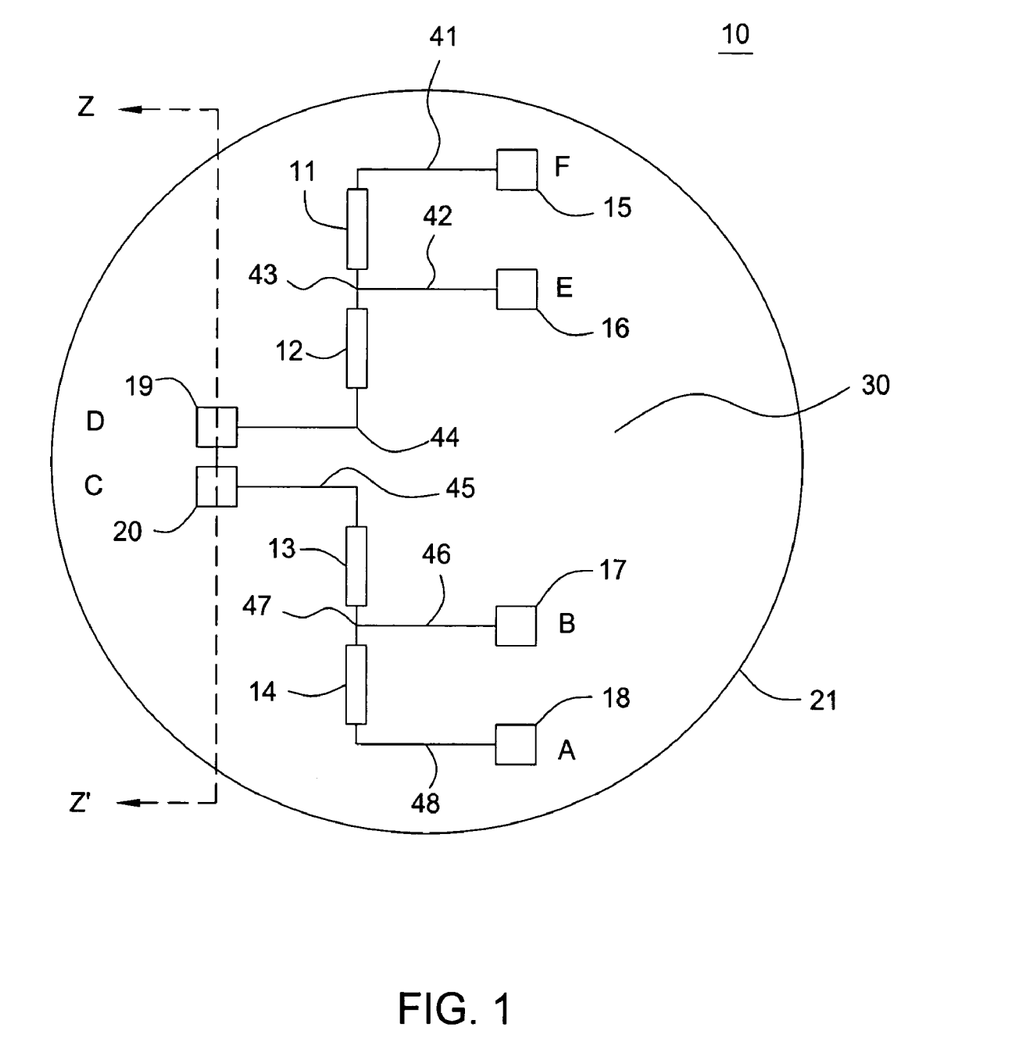
FIG. 1 shows a simplified diagram of a circular, thin film, pressure sensing membrane realized in accordance with the present invention.

FIG. 1 shows a schematic top view of pressure sensing membrane 10. Membrane 10 includes a flexible structure 30 having an outer perimeter region 21. Flexible structure 30 comprises a plurality of layers that are patterned and even doped to form the necessary piezoresistive elements and their interconnections and contacts, if necessary. Perimeter region 21 is an outer portion of the membrane that is generally secured by a retaining ring or other attachment means to the header of a body or housing that, together with the membrane, is generally referred to as the pressure sensor. The body or housing of the pressure sensor is not shown in the drawings, but is well understood in the art and is commercially available. Typically, the membrane is affixed to a cylindrically shaped extension (the header assembly) from the pressure sensor housing.

Piezoresistive elements 11, 12, 13, and 14 are spaced apart and disposed substantially along a central axis or a major axis of the membrane. Alphanumeric designations R1 through R4 shown in FIG. 1 are used for piezoresistive elements 12, 13, 11, and 14, respectively, for use in the description of FIGS. 2 and 4 below.

In the exemplary membrane shown in FIG. 1 for illustrative purposes, predetermined ones of the piezoresistive elements are interconnected by leads 43 and 47. Lead 43 is shown connecting elements 11 and 12, whereas lead 47 is shown connecting elements 13 and 14. Leads 41, 42, 44, 45, 46, and 48 are shown in FIG. 1 providing electrical connectivity between the element terminals and the various contact pads.

Contact pads 15 through 20 are distributed about a surface of the membrane to allow access to predetermined terminals of the piezoresistive elements. The contact pads are also labeled alphabetically, A through F, for use in the description of FIG. 4. Contact pad 15 connects to a first terminal of element 11 via lead 41; contact 16 connects to the second terminal of element 11 and the first terminal of element 12 via leads 42 and 43; contact pad 17 connects to the second terminal of element 13 and the first terminal of element 14 via leads 46 and 47; contact pad 18 connects to the second terminal of element 14 via lead 48; contact pad 19 connects to the second terminal of element 12 via lead 44; and contact pad 20 connects to the first terminal of element 13 via lead 45. Details about the fabrication of contact pads, leads, piezoresistive elements and flexible structure of membrane 10 are presented below primarily in reference to FIG. 3.

Although the exemplary embodiment for membrane 10 shown in FIG. 1 is circular in shape, it is contemplated that a membrane can be made in a rectangular shape, a square shape and another desirable shape while still employing the principles of the current invention. The shape of a membrane is determined primarily by the shape of the header assembly in the pressure sensor. The header assembly is that portion of the pressure sensor housing onto which the membrane is fitted and attached. As the shape of the membrane is changed, the axis along which the piezoresistive elements are disposed also changes. But that axis is anticipated to be a central axis or a major axis since the major axis generally intersects a central region of the membrane. The terms "central axis" and "major axis" are used interchangeably herein without any limitation or loss of generality.

In general, the elements are disposed substantially collinearly along a substantially central axis of the membrane. In the preferred embodiment, that axis coincides with or is in the vicinity of the diameter of the circular shaped membrane shown in FIG. 1. For a square or rectangular shape, the axis can be a diagonal or any other line that crosses through or in the vicinity of the center of the membrane shape.

Perimeter region 21 is an outer region of the membrane that is secured to the header of the pressure sensor. While the procedures used to secure the membrane to the pressure sensor should preferably cause the membrane and the piezoresistive elements to be substantially centered over the header opening, it should be understood that the pressure sensing membrane will operate as intended provided that all the piezoresistive elements are located within the opening of the header when the membrane is attached to the header of the pressure sensor housing. Typically, the pressure sensing membrane is attached to the header assembly by using an epoxy or other appropriate adhesive.

It should be noted that the membrane shown in FIG. 1 is not drawn to scale. Moreover, the size and location of the elements, the width and length of the leads, and the size and location of the contact pads are merely illustrative and not drawn to scale. It is contemplated that the contact pads distributed about the membrane surface in any of a number of desired locations or they can be located within the membrane perimeter region. In the latter case, it may be desirable to reduce the exposure of the contacts to vibrations of the membrane by locating the contacts outside the header opening.

When the contact pads are located near the edge of or outside the header opening for the sensor, the contact pads are subjected to less movement and force and therefore are less likely to experience fatigue or other types of failure.

Figure 4:
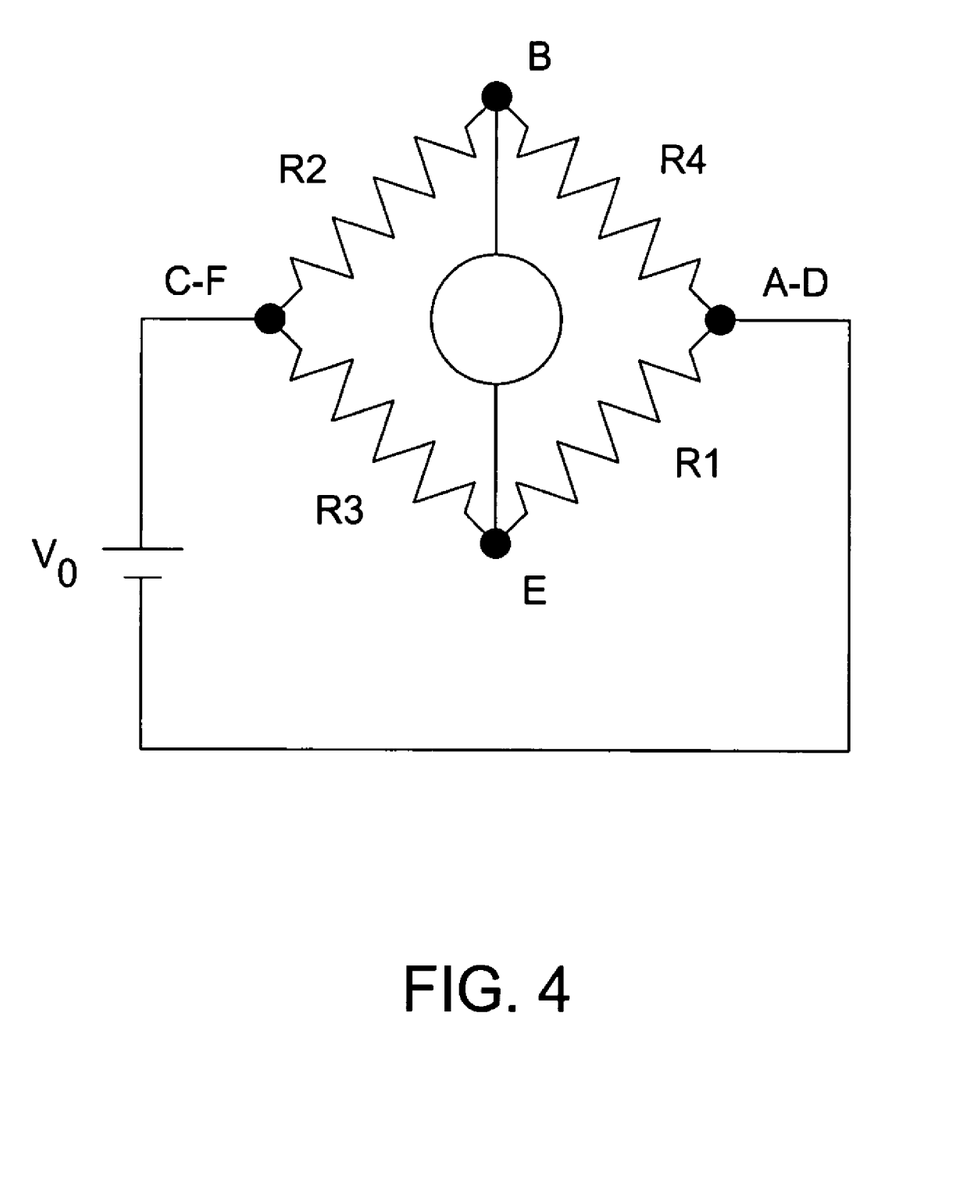
FIG. 4 shows an operational electrical circuit realized by interconnection of the piezoresistive elements of the membrane in FIG. 1.

Judicious external connection of contacts 15 through 20 can result in various circuit configurations for the piezoresistive elements. For the arrangement shown in FIG. 1, it is possible to connect the contacts in circuit to form a Wheatstone bridge as depicted in FIG. 4. The Wheatstone bridge arrangement is realized by connecting contact pad C to contact pad F and by connecting contact pad A to contact pad D. The supply voltage Vdc is placed across combined contact pads A/D and C/F, while the output voltage, Vm, is observed between contact pads B and E. Standard wire connection techniques including soldering or thermal or pressure bonding or the like are contemplated for making external connection to the contact pads.

Although external connection of the contact pads has been described above for achieving a particular circuit configuration for the piezoresistive elements, it will be apparent to persons skilled in the art that conductive leads can be patterned into the pressure sensing membrane in order to achieve the same result. In a similar vein, it is contemplated that the substantially collinear individual elements are separated having no leads connecting their respective terminals together on the membrane itself. Instead, connection would be made solely by external connection of the respective contact pads and, thereby, the respective terminal ends of each piezoresistive element. Of course, separated individual elements could also be connected via a conductive lead pattern on the membrane.

The functionality of the pressure sensing membrane is based on a resistance change of each piezoresistive element in the thin film structure when pressure is applied to the flexible membrane. Resistance of any element such a piezoresistive element is given by, $$R = \rho L/A \quad (1)$$

where R is the resistance in ohms ($\Omega$), $\rho$ is the resistivity of the material expressed in $\Omega \cdot m$, A is the cross-sectional area of an element in $m^2$, and L is the length of the element in m. In an example from experimental practice, each piezoresistive element is realized with n-doped hydrogenated amorphous silicon and exhibits the following characteristics: the length is 1.0 mm, the average cross-sectional area is 0.5 $mm^2$, the resistivity is 1.28 $\Omega \cdot m$, and the resistance in the neutral or unflexed state is 2.56 $k\Omega$.

Figure 2:
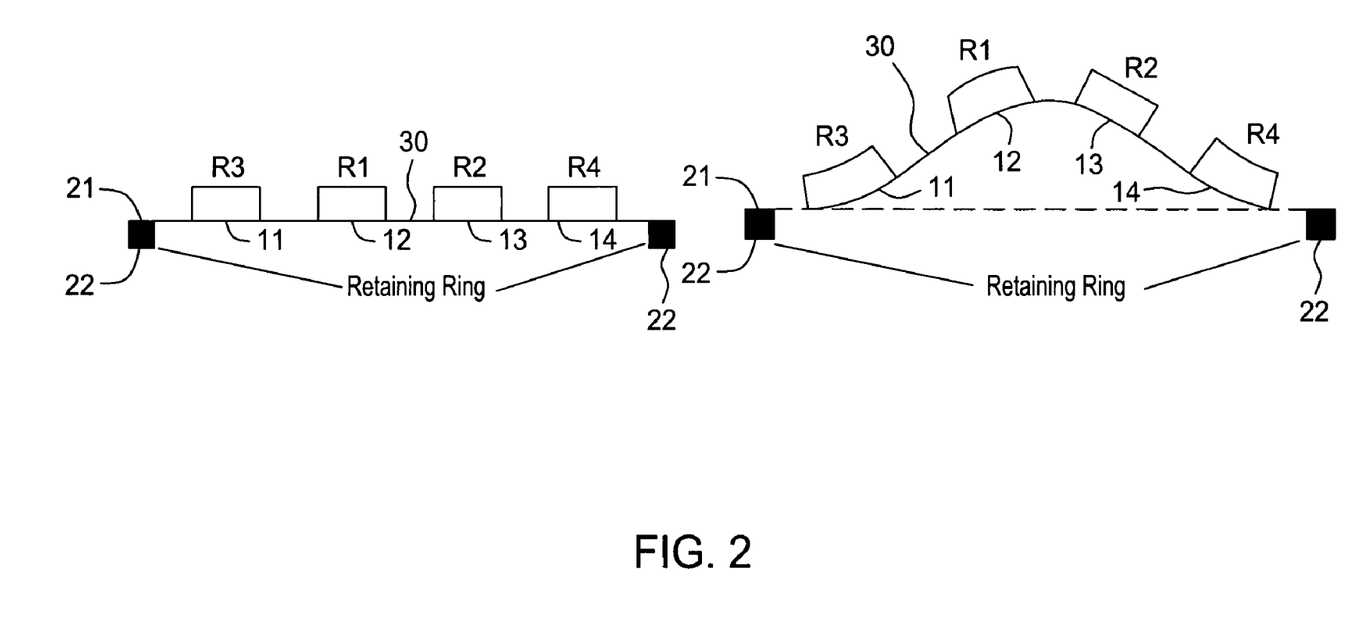
FIG. 2 shows a simplified cross-sectional view of the membrane in both an unflexed state and a flexed state.

As shown in the FIG. 2, a cross-section of the membrane taken through the piezoresistive elements is depicted in an unflexed or neutral state on the left and in a flexed state on the right. Elements 11–14 are shown on flexible structure 30 to exaggerate the response to deformation forces acting on each piezoresistive element when pressure is applied to the membrane. The membrane is shown with a retaining ring 22 attached to the membrane in order to pin the applied force at the membrane perimeter. When pressure is applied to the pressure sensing membrane, the substrate flexes as shown on the right in FIG. 2. This results in a change of the geometric properties for the piezoresistive elements from the neutral or unflexed state. Elements 11 and 14 experience compressive force thereby decreasing their respective lengths. Elements 12 and 13 experience tension causing an increase in their respective lengths. As seen from Equation 1, length changes directly affect the resistance of a piezoresistive element.

Although the leads have a finite resistance associated therewith, it is desirable to fabricate each lead to minimize its contribution to the overall resistance of the piezoresistive elements. That is, the resistance of the leads should be as small as possible in comparison to the resistance of the piezoresistive elements.

The pressure sensing membrane is fabricated using standard thin film processing technology on a flexible substrate. Polyimide is one material that is preferred for use as the substrate. Kapton E® by Dupont is a commercially available polyimide film. This material is chosen for use in realizing the present invention because it exhibits low shrinkage, high elastic modulus, and inertness to chemical etchants used in processing of the membrane layers. Other flexible films suitable for use in the present invention include organic plastics, polyamides and the like. Other commercially available forms of Kapton that are useful for realizing the present invention include Kapton HV, Kapton HN, and Kapton PDMS. Choice of a suitable flexible film substrate material is also dependent upon the type of semiconductor system employed for the membrane layers and the individual piezoresistive elements. Exemplary semiconductor systems contemplated for use in realizing the present invention include, but are not limited to, Group III–V, Group II–VI, and Si/Ge. Binary, ternary and quaternary compounds from the Group III–V and Group II–VI systems are contemplated for use herein.

Figure 3:
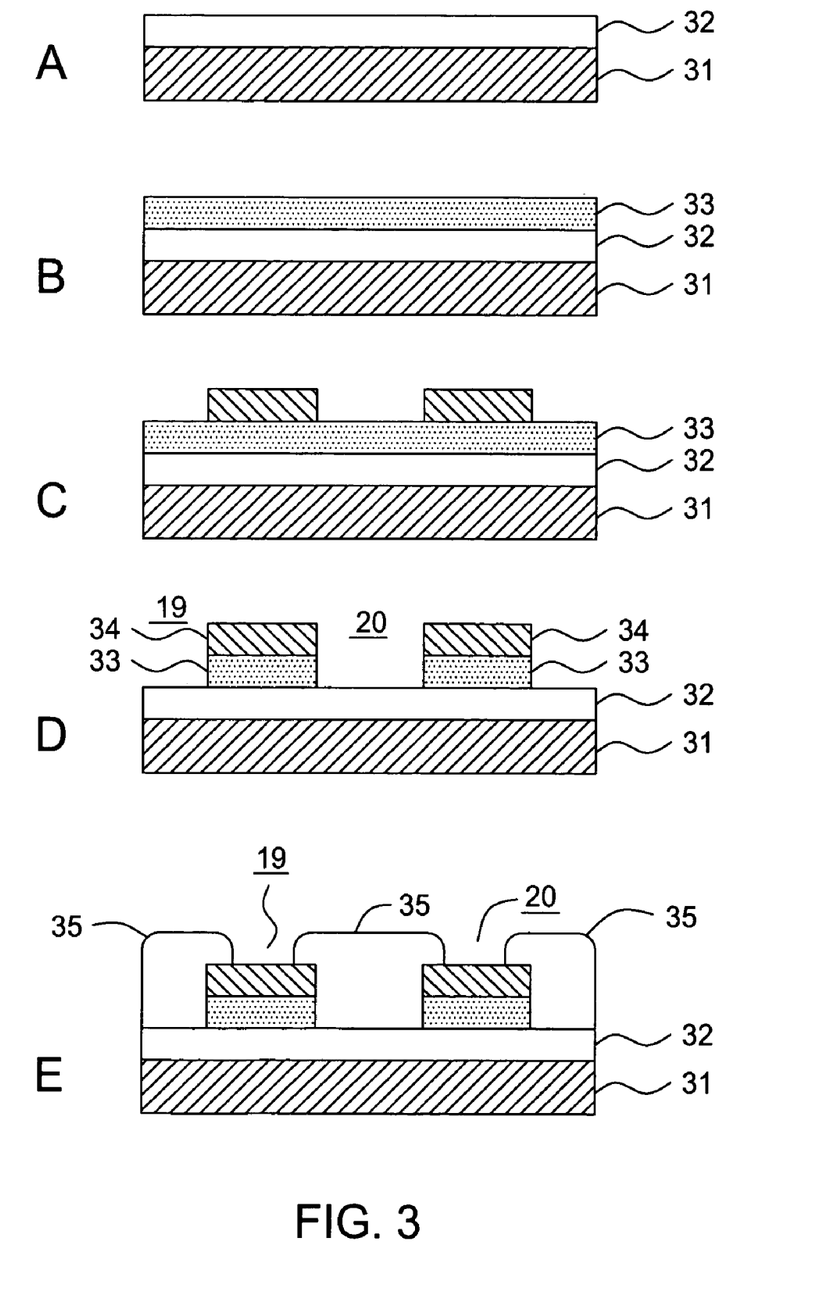
FIG. 3 shows a series of fabrication steps in realizing an exemplary membrane.

Fabrication of the exemplary membrane shown in FIG. 1 through cross-section Z–Z' is depicted in Steps A through E in FIG. 3. In step A of FIG. 3, layer 32 is deposited over substrate 31. Layer 32 is grown to a thickness of 380 nm using SiNx. Substrate 31 is formed from a polyimide film such as Kapton E at a thickness of 51 μm. In Step B of FIG. 3, an hydrogenated amorphous silicon (α-Si:H) layer included in layer 33 is grown over layer 32 to a thickness of 200 nm. In Step C of FIG. 3, an n$^+$ doped α-Si:H layer also included in layer 32 is grown over the α-Si:H layer to a thickness of 65 nm. Growth of these layers is accomplished by plasma enhanced chemical vapor deposition (PECVD). The growth environment was maintained substantially at 250° C. and 500 mTorr. In order to assure reproducible, high-quality film layers, the SiNx, α-Si:H and n$^+$ doped layers have been deposited sequentially in-situ in a multiple chamber PECVD system. Also as shown in Step C, a contact pad layer 34 is deposited to a thickness of 100 nm using Cr. The contact pads are patterned to the desired size and shape via standard photolithographic techniques. As shown in Step D of FIG. 3, layer 33 including both the n$^+$ type and α-Si:H layers is etched away using reactive ion etching (RIE) to eliminate any leakage current. Although not shown in Step D, it is understood by persons skilled in the art that the piezoelectric elements and the various leads are also defined using standard photolithography and RIE techniques. In Step E of the process shown in FIG. 3, a passivation layer 35 is grown to a thickness of 350 nm using SiNx in order to passivate and protect the underlying layers of the membrane from the environmental effects. Layer 35 encapsulates the layers of the membrane before subjecting the membrane to standard annealing at 350° C. for approximately 30 min. It should be noted that windows are exposed in layer 35 using standard photolithography and RIE in order to gain access to each contact pad.

When processing is complete, an exemplary device will resemble the membrane shown in FIG. 1. The exemplary circular pressure sensing membrane has a 7.0 mm diameter and is comprised of semiconductor layers having a total thickness of 645 nm. The Cr contact pads are 1.0 mm square as shown in FIG. 1.

In order to interconnect the piezoelectric elements into a circuit configuration such as a Wheatstone bridge as shown in FIG. 4, externally conductive leads such as wires are attached to the contact pads as described above. In one example from experimental practice, gold wires are connected to contact pads using 99.9999% pure Indium solder to arrange the piezoelectric pressure sensing elements into the Wheatstone bridge configuration.

The Wheatstone bridge arrangement is powered by a constant current power supply depicted as Vdc (1.0 mA at 5.0 Vdc) having low thermal drift. The Wheatstone bridge output root-mean-square voltage (Vm) was observed and plotted in FIG. 5 as a function of applied pressure ($\sqrt{psi}$).

Wheatstone bridge measurement is a differential technique. This makes it more sensitive than measurement using a single resistor. Bending of the flexible piezoresistive elements changes the resistance values and creates a commensurate imbalance in the Wheatstone bridge thereby causing an output current to flow between contacts B and E. The output current (voltage drop) is proportional to the resistance imbalance created. This configuration is substantially insensitive to temperature variations.

The Wheatstone bridge output for the circuit shown in FIG. 4 can be analytically expressed as follows, $$Vm = Vdc \times \left[ \left( \frac{R3}{R1 + R3} \right) - \left( \frac{R2}{R2 + R4} \right) \right] \quad (2)$$

where R1, R2, R3, and R4 are resistances of piezoresistive elements 12, 13, 11, and 14, respectively, Vm is the bridge output voltage, and Vdc is the supply voltage. The output Vm is positive if R4 (tension)>R3 (compression).

Typically, the piezoresistive elements are designed to be substantially identical. In this way, the Wheatstone bridge would be substantially balanced with no output Vm in the inflexed state for the membrane. It is contemplated that one could design the elements such that the innermost elements are substantially identical yet different in resistance from substantially identical outermost elements. Other such combinations are also contemplated. But it should be noted that the preferred embodiment of the membrane using elements in a Wheatstone bridge arrangement would provide a zero output signal when no pressure is applied to the membrane.

Figure 5:
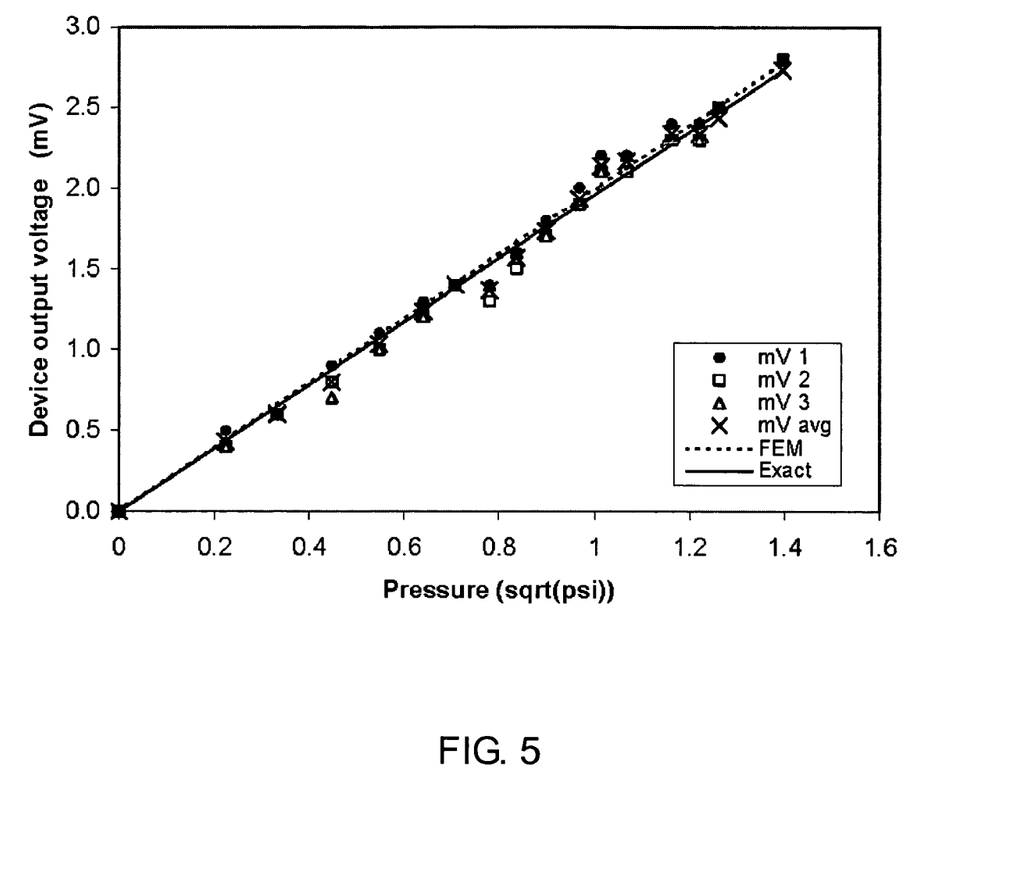
FIG. 5 shows the relationship between the applied pressure and the output voltage of the membrane arranged as shown in FIG. 4.

A typical pressure sensor response to applied pressure is as shown in FIG. 5 for a pressure sensor employing the membrane described herein. In the range of 0 psi–0.1 psi, the measured output voltage exhibits an initial transient response due to internal thin film stresses. After this range, a nearly linear relationship is observed between the pressure and the output voltage. The exact form of the solution discussed below shows that the device output voltage varies linearly with the square root of the applied pressure.

Simulation of the membrane operation using two-dimensional finite element analysis for homogeneous and isotropic material has been developed to calculate the deflection and corresponding sensor voltage output for comparison with the observed data. For the model, a 10×10 grid of four node rectangular shape function elements was modeled using a finite element modeling (FEM) program known as Mathematica v4.1. The analytical solution for the FEM program and the exact solution given by the observed data are given as, $$Vdc_{FEM} = 142829 \times \xi \times \sqrt{\frac{P \times A}{\rho}} \quad (3)$$

$$Vdc_{Exact} = 140496 \times \xi \times \sqrt{\frac{P \times A}{\rho}} \quad (4)$$

where P is the applied pressure, A is the cross-sectional area of membrane under pressure, $\rho=1.42\times10^3$ Kg/m$^3$ is the density of thin film membrane system, a calibration constant $\xi=0.05244$ converts thin film membrane deflection into a corresponding output voltage. The exact solution is plotted in FIG. 5 as a solid line and the FEM solution is plotted in FIG. 5 as a dashed line.

The numerical constants in Equations 3 and 4 above are derived from Mindlin theory. Mindlin theory accounts for the substrate and thin film Young's modulus (Y=30 Gpa), Poisson's ratio (v=0.3), and thickness components under the material matrix, $D_m$. Mindlin theory is described in the following references which are incorporated by reference herein in their entirety: R. D. Cook et al., Concepts and Applications of Finite Element Analysis, 3rd ed., (John Wiley, N.Y, 1989), and T. J. R. Hughes, The Finite Element Method, (Prentice Hall, Englewood Cliffs, N.J., 1987).

Experimental tests were repeated on the pressure sensing membrane with reproducible results. The results are plotted for three tests labeled "mV1" (circular data points), "mV2" (square data points), and "mV3" (triangular data points). In addition, an average of the test data is shown in FIG. 5 labeled "mVavg" using the x data point symbols. The raw experimental data agrees with FEM modeling solution to within 8.51% at 12 digits of machine precision, whereas the FEM modeling solution and the analytical solutions described above agree to within approximately 2%. The pressure sensor sensitivity in the 0–2.0 psi range is determined to be 1.953±0.020 mV/$\sqrt{psi}$, with an observed linear correlation of 0.9892 as determined by a linear regression fit. The percentage of sensitivity error is 0.1023% when compared to the exact analytical solution of 1.955 mV/$\sqrt{psi}$ computed from Equation 4.

The pressure sensor will measure low (<2 PSI) pressures over an area of ~1 cm$^2$ (for a single sensor) or over larger areas (4" by 4") for an array of sensors.

In order to convert the output voltage from the membrane to a pressure reading for recording or other use, it is preferred that one or both of equations 3 and 4 be used since these equations calibrate and characterize the operation of the pressure sensing membrane. For example, output voltage $V_m$ can be supplied to a processing device such as a personal computer, a digital signal processor, or the like. The processing device then uses the equation or equations above to determine the sensed pressure corresponding to the supplied output voltage. Alternatively, solutions to the actual or FEM equations could be stored as a look up table in memory. A supplied output voltage can then be sent to the look up table thereby causing the memory to read and output the corresponding pressure from the table.

While the foregoing is directed to embodiments of the present invention, other and further embodiments of the invention may be devised without departing from the basic scope thereof, and the scope thereof is determined by the claims that follow. In particular, it is contemplated that a plurality of piezoresistive elements can be disposed in the membrane either collinearly or as multiple arrays of substantially collinear elements. In the case of multiple arrays of plural collinear elements, the groups of elements can still be centrally located on or near a major axis of the membrane. For example, it is contemplated that two groups of four elements each, wherein each group is adapted for connection in a Wheatstone bridge configuration, can be distributed symmetrically about one or more major axes of the membrane. Each set of collinear elements can be interconnected into a desired circuit arrangement and calibrated prior to operation as described hereinabove.

It is also contemplated that other impedance devices such as capacitors and the like can be substituted for the piezoresistive elements. While the illustrative embodiments described herein have been realized using a particular n+ dopant, it is contemplated that p dopants such as boron and the like and other n dopants such as phosphorus and the like can be used to realize the electrical leads and components in the membrane. It is also contemplated that nanocrystalline layers of silicon, germanium, and carbon can be utilized in place of the doped hydrogenated amorphous silicon layers. It is also contemplated that contact pads can be realized from conductive metals such as Cr, Al, Ta, Ti, and the like. In addition, multilayer contact pad structures are also contemplated.

The invention claimed is:

1. A pressure sensing membrane for use in a pressure sensor, the membrane comprising:
    a flexible substrate having a substantially uniform thickness, said substrate having an outer perimeter defined thereon adapted for fixable mounting within said pressure sensor, said substrate comprising a plastic material selected from the group of materials consisting of Kapton, polyimide, polyamide, and organic plastics;
    a plurality of piezoresistive elements formed over said substrate and located within said outer perimeter, said plurality of piezoresistive elements being disposed substantially collinearly and adapted to be connected in a predetermined circuit configuration;
    wherein the pressure sensing membrane is flexibly responsive to at least a low pressure condition at or below 2 psi.

2. The pressure sensing membrane as defined in claim 1 wherein the plurality of piezoresistive elements is located in a substantially central region of the membrane.

3. The pressure sensing membrane as defined in claim 2 wherein the plurality of piezoresistive elements is substantially coincident with a major axis of said membrane.

4. The pressure sensing membrane as defined in claim 3 wherein the plurality of piezoresistive elements includes first, second, third and fourth piezoresistive elements arranged in order in the membrane, said first piezoresistive element connected at one end to said second piezoresistive element and at another end to said third piezoresistive element said fourth piezoresistive element also being connected at one end to said second piezoresistive element and at another end to said third piezoresistive element, said fourth piezoresistive element being connected to each of said second and third piezoresistive elements at a different end from said first piezoresistive element so that said predetermined circuit configuration for the four piezoresistive elements forms a Wheatstone bridge.

5. The pressure sensing membrane as defined in claim 4 wherein the first through fourth piezoresistive elements exhibit substantially identical resistances and, in said Wheatstone bridge, an input port is defined by two terminal wherein one terminal of the input port is connected between said first and third piezoresistive elements and another terminal of the input port is connected between said second and fourth piezoresistive elements, arid an output port is also defined by two terminals wherein one terminal of the output port is connected between said first and second piezoresistive elements and another terminal of the output port is connected between said third and fourth piezoresistive elements.

6. The pressure sensing membrane as defined in claim 1 wherein said piezoresistive elements each comprise a patterned layer of doped hydrogenated amorphous silicon.

7. The pressure sensing membrane as defined in claim 6 wherein dopants included in said patterned layer are selected from the group consisting of n type dopants and p type dopants.

8. The pressure sensing membrane as defined in claim 1 wherein said piezoresistive elements each comprise a patterned layer of doped nanocrystalline semiconductor material.

9. The pressure sensing membrane as defined in claim 8 wherein dopants included in said patterned layer are selected from the group consisting of n type dopants and p type dopants.

* * * * *